United States Patent [19]

Ricks

[11] 4,190,856
[45] Feb. 26, 1980

[54] THREE DIMENSIONAL TELEVISION SYSTEM

[76] Inventor: Dennis E. Ricks, 1166 Briar Ave., Provo, Utah 84601

[21] Appl. No.: 853,322

[22] Filed: Nov. 21, 1977

[51] Int. Cl.² .............................................. H04N 9/58
[52] U.S. Cl. ..................................... 358/88; 350/169; 350/171; 350/174
[58] Field of Search ...................... 358/88, 89, 91, 92, 358/250; 350/169, 171, 174

[56] References Cited

U.S. PATENT DOCUMENTS

| | | | |
|---|---|---|---|
| 3,493,290 | 2/1970 | Traub | 358/89 |
| 3,536,921 | 10/1970 | Caulfield | 358/89 |
| 3,551,043 | 12/1970 | Neuberger | 350/174 |
| 3,912,856 | 10/1975 | Liddel | 358/88 |
| 3,956,833 | 5/1976 | Chase | 358/89 |

Primary Examiner—Howard W. Britton
Attorney, Agent, or Firm—Thorpe, North & Gold

[57] ABSTRACT

A method and apparatus for producing a three-dimensional picture suitable for use with television systems. A set of representations of differing cross-sections of a scene is displayed on one or more display screens. These displayed representations are optically stacked along a common optical axis by an arrangement of beam splitters to form a composite three-dimensional picture. At least one positive lens is included within the apparatus for repositioning the composite picture forward toward a viewing audience. A method and apparatus are also disclosed for enlarging the picture, minimizing translucency therein and developing multiple viewing locations for increasing audience enjoyment.

30 Claims, 15 Drawing Figures ity, and sectioning. A brief discussion of each of these approaches follows. For more detailed information, refer to Takanori Okoshi's excellent review of the current state of the art entitled *Three-dimensional Imaging Techniques*, Academic Press, New York (1976).

THREE DIMENSIONAL TELEVISION SYSTEM

BACKGROUND OF THE INVENTION

The present invention relates to three-dimensional imaging techniques and, more specifically, to a novel system for displaying three-dimensional images.

The development of a three-dimensional display technique suitable for application to home television has long been sought, but, although several efforts have been made to find such a technique, none has proved satisfactory for commercialization. The most noteworthy of these attempts can be divided into four separate approaches: stereoscopy, integral photography, holography, and sectioning. A brief discussion of each of these approaches follows. For more detailed information, refer to Takanori Okoshi's excellent review of the current state of the art entitled *Three-dimensional Imaging Techniques*, Academic Press, New York (1976).

Stereoscopy

The first approach to three-dimensional imaging is known as stereoscopy. A stereoscope displays two images, each corresponding to a unique perspective of a scene and each displayed in such a way that it can be seen by only one eye. This type of approach is most commonly used today in toy stereo veiwers and has also had a limited application to closed circuit television in some areas of scientific research. However, it has not been used in home television for a number of reasons, including the fact that the illusion produced is not a satisfactory three-dimensional image, and including the additional fact that the audience must wear special viewing glasses to obtain this illusion.

Integral Photography

The second approach to three-dimensional imaging is known as integral photography. Its three-dimensional effect is achieved by recording and then displaying a great number of perspective views of a scene through the use of a fly's-eye lens. This approach has been limited in application to such novelty items as three-dimensional covers for children's books. However, it would be extremely difficult to apply to television, due to technical problems related to the large bandwidth required to transmit the picture, which bandwidth is on the order of 1,000 times the bandwidth required to transmit a flat picture.

Holography

The third approach to three-dimensional imaging is known as holography. Its three-dimensional effect is accomplished by recording on film the interference pattern produced by the interaction between the object to be recorded and coherent light such as that produced by a laser. In the reconstruction process this interference pattern is illuminated by monochromatic light producing a wavefront similar to the originally recorded wavefront from the object. Here again, technical problems associated with the large bandwidth and with the use of coherent light sources appear to make the application of this approach to television virtually impossible in the foreseeable future.

Sectioning

The fourth approach to three-dimensional imaging is known as sectioning. It presents none of the problems encountered by the approaches previously described, i.e., the picture produced truly has depth; no viewing glasses are needed; only a relatively small bandwidth is required; and normal (incoherent) light is used. As a result, the sectioning approach appears to hold the most promise for home three-dimensional television. An understanding of this approach is vital to an understanding of the present invention.

Referring now to FIG. 1, sectioning methods produce their three-dimensional effect by first of all, recording a single time frame of a scene 14 by some means, and then separating the recorded scene 14 into a plurality of component cross sections 15, 16, 17 and 18. A set of two-dimensional cross-sectional representations 19, 20, 21, and 22, which corresponds to a single time frame of the scene 14, is then displayed in such a way that the representations 19–22 appear to an audience 23 to be stacked in a series, one behind another along a common optical axis 24, to form a composite three-dimensional picture 25.

The various methods for reproducing a three-dimensional scene from such a set of cross-sectional representations can be classified into two categories. The first category includes those methods that utilize sequential stacking of the set of cross-sectional representations. The second category includes those methods that utilize concurrent stacking of the set of cross-sectional representations.

Sequential Stacking.

Sectioning methods which utilize sequential stacking of the set of cross-sectional representations display the representations one at a time in a rapid sequence, in such a way that they appear to be stacked one behine another along the common optical axis. This can be done, for example, by continuously altering the position of the display screen while it displays the representations. Examples of sequential stacking methods are disclosed in U.S. Pat. Nos. 2,361,390; 3,462,213; 3,493,290; and 3,605,594. None of these methods has been found to be acceptable for commercial television, however, primarily because of the extremely rapid rate at which the associated mechanisms must operate.

Concurrent Stacking.

Sectioning methods which utilize concurrent stacking of the set of cross-sectional representations stack the entire set of representations at the same time so that they appear to be stacked one behind another along the common optical axis. Examples of methods utilizing concurrent stacking are disclosed in U.S. Pat. Nos. 1,636,834; 2,336,508; and 3,551,043. Each of these methods uses an optical system comprising an arrangement of beam splitters to stack the set of cross-sectional representations concurrently.

An example of an optical system utilizing concurrent stacking is shown in FIG. 2 comprising one beam splitter 26, two projectors 27 and 28, two projection lenses 29 and 30, and two display screens 31 and 32. These projectors 27 and 28, with the aid of the projection lenses 29 and 30, project respective cross-sectional representations onto corresponding display screens 31 and 32. Light rays, represented by arrows emanating from the display screens 31 and 32, are directed by the beam splitter 26 into a common optical axis 33 which is directed through a viewing window 34 towards the audience 35. The length of the optical path from the first display screen 31 to the viewing window 34 is shorter than the length of the optical path from the second display screen 32 to the viewing window 34. As a result, the first representation, which is displayed on the face of the first display screen 31, appears to be in a location 36 which is in front of the location 32 of the second representation. This set of two optically stacked representations comprises the three-dimensional picture 37.

U.S. Pat. No. 3,551,043 also discloses the use of a third lens which is designed and positioned so as to make the cross-sectional representations appear to be successively farther away from the audience, which, for that invention's intended application as an astronaut trainer, is desirable.

Concurrent stacking of the cross-sectional representations through the use of beam splitter arrangements, as described above, is much more practical than sequential stacking. The main reason for this is that such beam splitter arrangements have no moving parts to break down as do sequential stacking methods. Another reason is that concurrent stacking methods require a bandwidth that is not appreciably greater than that required for television transmission of a flat picture. This modest bandwidth is approximately one tenth the size that would be required to transmit the same picture with the sequential stacking approach.

However, despite all the advantages of concurrent stacking of the cross-sectional representations through the use of beam splitters, none of the concurrent stacking methods described above has been able to produce a three-dimensional picture of sufficiently high quality to be acceptable for application to home television.

OBJECTS AND SUMMARY OF THE INVENTION

It is, therefore, an object of the present invention to provide a method and apparatus for producing a high quality three-dimensional picture which comprises a set of concurrently stacked, cross-sectional representations; so that said apparatus will be acceptable for application to home television.

It is a further object of the present invention to provide a method and apparatus for accomplishing forward repositioning of the three-dimensional picture.

A further object of the present invention is to provide a method and apparatus for enlarging the three-dimensional picture.

Another object of the present invention is to provide a method and apparatus for conserving space so as to minimize the size of the optical system, while at the same time permitting greater enlargement of the three-dimensional picture.

It is a further object of the present invention to provide a method and apparatus for producing a plurality of viewing locations from which to view the three-dimensional picture by a plurality of observers.

Another object of the present invention is to provide a method and apparatus for minimizing image translucency of the three-dimensional picture.

These and other objects are realized in a method and apparatus suitable for use with television systems for producing a composite three-dimensional picture by displaying a set of cross-sectional representations of a scene on one or more display screens and optically stacking the displayed representations along a common optical axis. A positive lens may be located along the optical axis at a distance from the display screens that is greater than one focal length thereof, thereby developing a desired forward repositioning of the picture. Additional lenses may be added to provide appropriate enlargement of the three-dimensional picture and to reduce physical space requirements for the apparatus. Apparatus and methods are also disclosed for developing a plurality of optical axes needed to increase the number of audience viewing locations. A light blocking means is included to reduce image translucency normally associated with such imaging systems and adds to the overall audience enjoyment provided by the apparatus disclosed.

Other objects and features will be apparent to those skilled in the art in view of the following detailed description, taken with the accompanying drawings.

THE FIGURES

DETAILED DESCRIPTION OF THE INVENTION

Figure 1A:
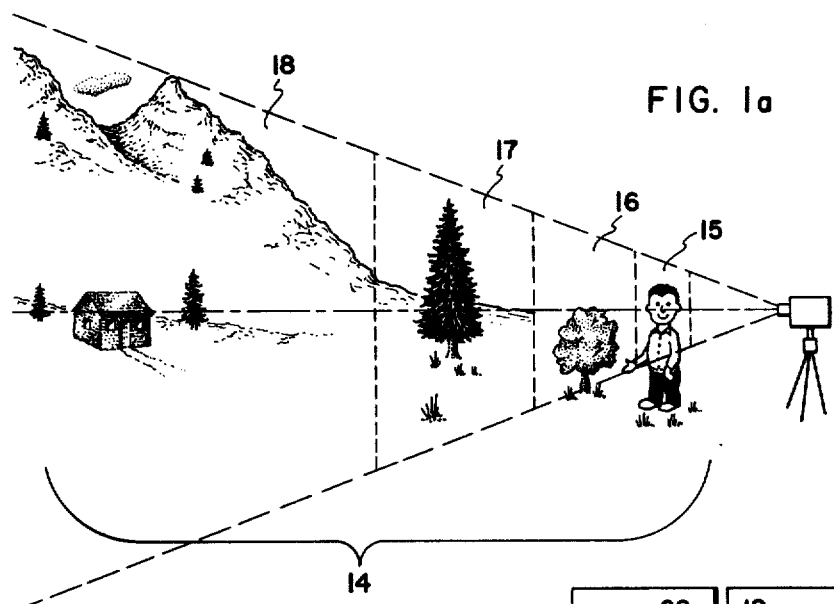
FIG. 1a is a graphic side view of a scene, separated into its component cross sections. p
Figure 1B:
FIG. 1b is the graphic scene of FIG. 1a, reduced to its component cross-sectional representations.
Figure 1C:
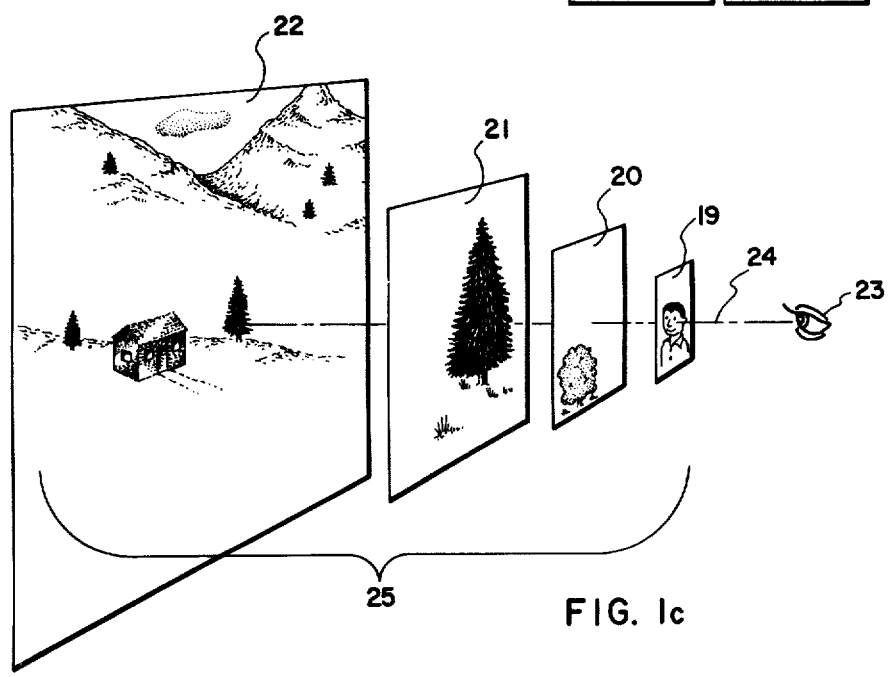
FIG. 1c shows the cross-sectional representations in proper orientation for three-dimensional viewing.
Figure 2:
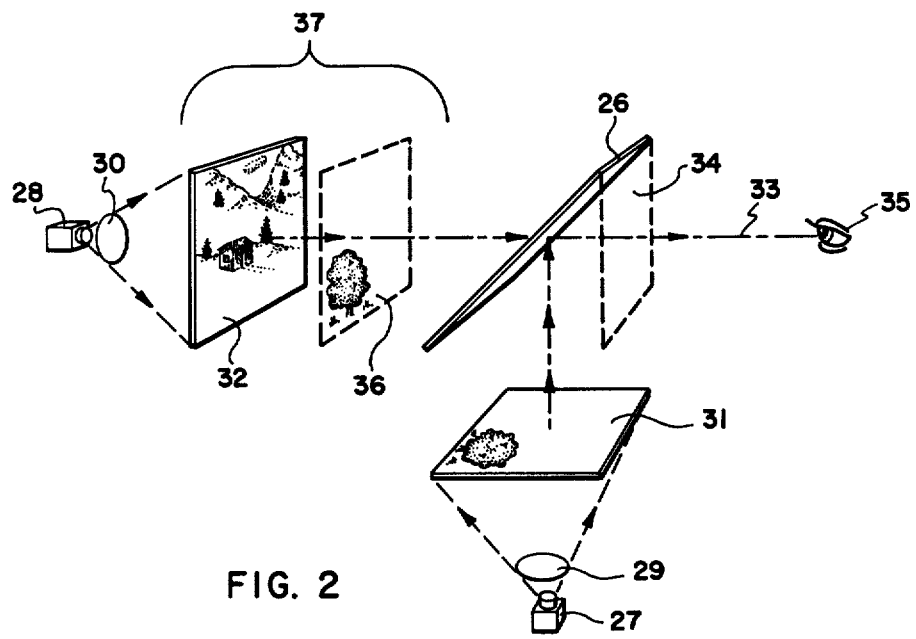
FIG. 2 is a perspective representation of a conventional optical system utilizing beam splitters, for producing a three-dimensional picture comprising a set of two cross-sectional representations.

Referring Now to the Drawings:

The Basic Optical System

Figure 3:
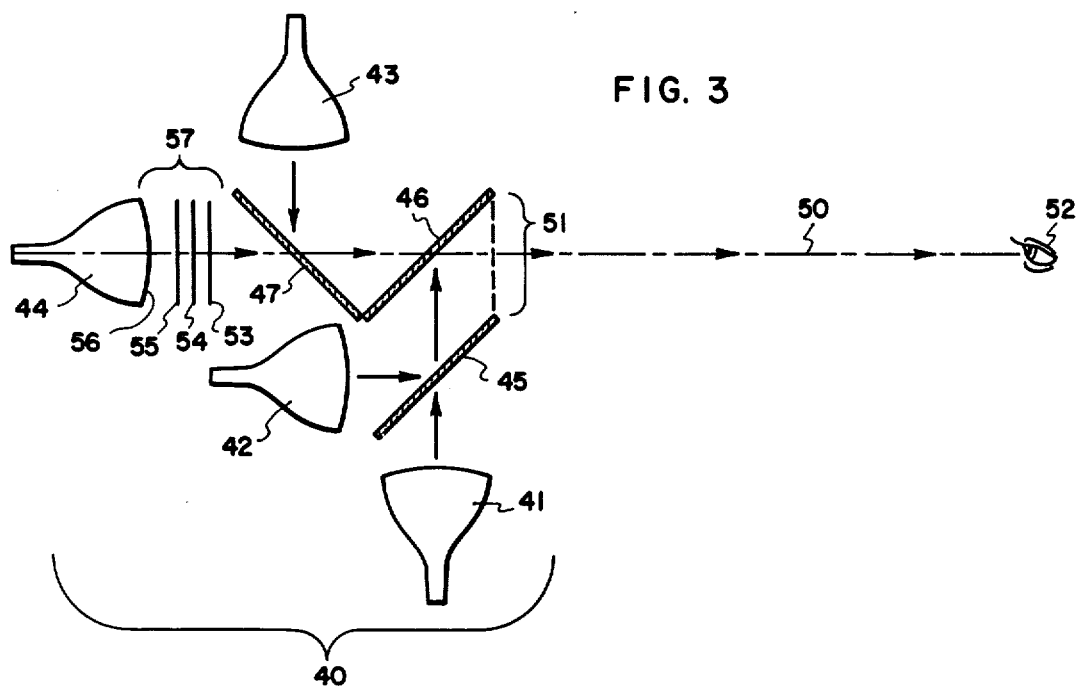
FIG. 3 is a schematic representation of a more sophisticated optical system utilizing beam splitters, for producing a three-dimensional picture comprising a set of four cross-sectional representations.

Fig. 3 discloses an optical system 40, comprising four display screens 41, 42, 43 and 44 for displaying a set of four cross-sectional representations, and three beam splitters 45, 46 and 47 for concurrently stacking the set of representations. This results in the set of representations being optically stacked along a common optical axis 50, which passes through the viewing window 51 towards an observer 52. To the observer 52, the representations appear to be in locations 53, 54, 55 and 56, and together form a composite three-dimensional picture 57.

In a preferred embodiment, the display screens will be substantially flat and light diffusing, such as the faces of television picture tubes. The beam splitters could be selected from such optical components as semi-transparent mirrors or prisms, although semi-transparent mirrors are preferred because they are less bulky than prisms. In FIG. 3 a set of only four representations is used, although a preferred embodiment would utilize a set of approximately 16 representations, so that the set of representations will visually blend in together. Also, in a television application it is generally preferred that the display screens display a series of such sets of representations to create an appearance of motion.

This basic optical system, however, is unacceptable for application to home television, because of a number of serious problems preventing its production of a high quality three-dimensional picture. The first of these problems is the fact that in such an optical system, the frontmost part of the three-dimensional picture appears to be a great distance back from the viewing window. The viewing window 51, as is demonstrated in this figure, is the optical system's front opening through which the audience 52 must look to see the three-dimensional picture 57. The distance between the viewing window and the three-dimensional picture will always be at least as great as the optical path distance between the viewing window and the nearest display screen. For a television application a large number of cross-sectional representations would be required, which in turn would require a large number of beam splitters, which means that this optical path distance would be quite large. The resultant effect is that the three-dimensional picture would be at the far end of an optical tunnel formed by the beam splitters, which for home television, is unacceptable.

A second problem is that if such a large number of cross-sectional representations are used, the optical system would have to be extremely large as it is in U.S. Pat. No. 3,551,043, or else the viewing window would be very small. This results from the fact that a large number of cross-sectional representations requires a large number of beam splitters, which means a large optical system. The alternative is to make the optical system smaller by using smaller beam splitters. However, using small beam splitters means that the viewing window will be small because the viewing window can be no larger than the beam splitters. Unfortunately, neither of these alternatives is acceptable for home television.

A third problem is one that is common to most three-dimensional imaging systems, and that is the fact that any particular perspective of the three-dimensional picture is observable by only one person at a time. This is analogous to a group of people trying to look at the same scene through the same window. Once one person is located so as to view the scene through the window from a preferred perspective, other people can only hope for a less desirable perspective, which limitation is unacceptable for home television.

A fourth problem is image translucency. This is common to all three-dimensional imaging systems utilizing the sectioning approach. Image translucency is caused by the sensation of being able to see through supposedly solid images in the three-dimensional picture. This results from the fact that the images which comprise the cross-sectional representations are only comprised of light, having no substance and therefore no means to block light from the portions of the background representations which appear to be behind them. Image translucency, however, is unacceptable for home television.

The following discussion presents several preferred embodiments of three dimensional imaging systems suitable to resolve these problems, both collectively and individually.

Repositioning the Picture

The First Lens

Figure 4:
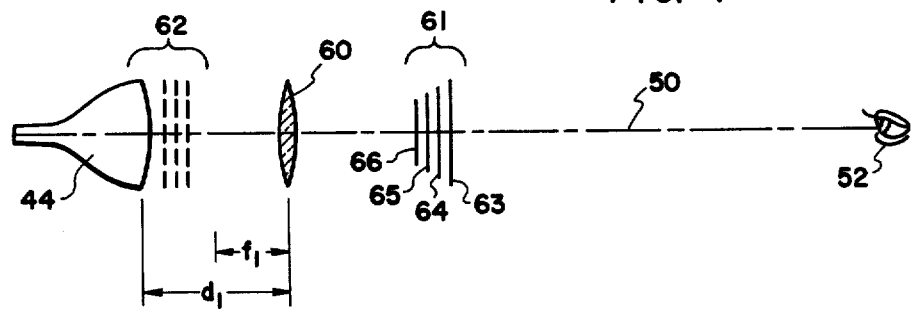
FIG. 4 is a schematic representation of an optical system comprising a first lens in accordance with the principles of this invention.

As previously stated, the first problem with the basic optical system is that the frontmost part of the three-dimensional picture appears to be a great distance back from the viewing window. One way to overcome this problem is to position a first lens between the three-dimensional picture and the audience to develop forward repositioning of the picture. As used herein, the term "lens" includes any lens means such as a single or multi-element lens and curved or lenticular mirrors. An example of this technique is demonstrated in FIG. 4, which shows a positive (convex) lens 60 positioned coaxially along the optical axis 50 between the audience 52 and the display screens 44. This first lens 60 is separated from the display screens 44 by an optical path distance $d_1$ that is greater than the focal length $f_1$ of the lens 60. It is this minimum distance of separation which enables the lens to reposition the picture forward, resulting in the picture 61 actually appearing to be in front of the repositioning lens 60.

The Second Lens

The use of this first lens 60 produces a substantial improvement in the appearance of the three-dimensional picture 61. However, one side effect of this technique is the fact that the representations which comprise the three-dimensional picture 61 may appear to be progressively smaller in back 64–66 than in front 63. This may be compensated for by positioning a second lens between the first lens 60 and the audience 52, to make all the representations appear to be more or less the same size.

Figure 5:
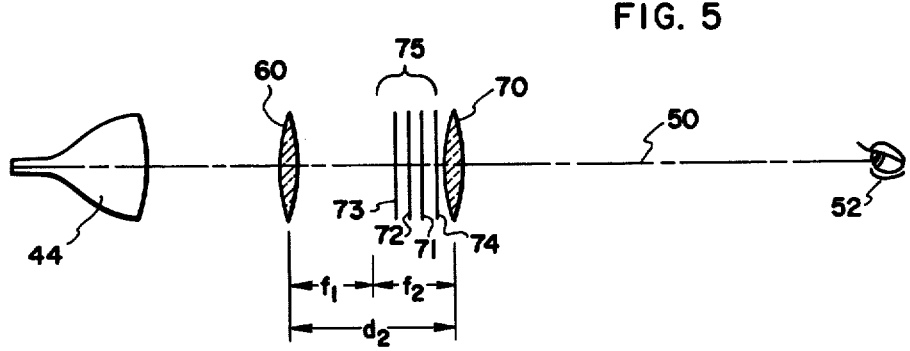
FIG. 5 is a schematic representation of an optical system further comprising a second lens in accordance with the principles of this invention.

This technique is demonstrated in FIG. 5, which shows the second lens 70 defining the viewing window, positioned along the optical axis 50 between the first lens 60 and the audience 52. This second lens 70 is separated from the first lens 60 by an optical path distance $d_2$ that is equal to the sum of the focal lengths $f_1$ and $f_2$ of the two lenses 60 and 70. By thus positioning this second lens 70, the background representations 71–73 are enlarged by successively greater degrees compared to the frontmost representations 74, as shown. This results in all of the representations 71-74 being approximately the same size.

Picture Enlargement

As stated previously, a second problem of the basic optical system is that either the viewing window will be too small or else the entire optical system will be too large. The ideal solution to this problem would be to enlarge the viewing window without increasing the size of the optical system. This can virtually be accomplished by using the described lens arrangement comprising the first and second lenses, with the focal length of the first lens being shorter than the focal length of the second lens.

Figure 6:
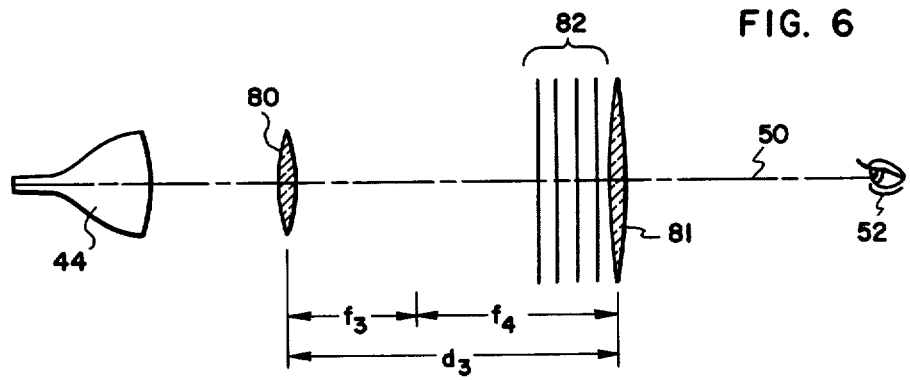
FIG. 6 is a schematic representation of an optical system wherein the first and second lenses are in an enlarging configuration in accordance with the principles of this invention.

A preferred embodiment of this technique is shown in FIG. 6. In this figure, the first lens 80 is approximately the same size as the display screen 44. The second lens 81, which defines the viewing window, is somewhat larger than the first lens 80 to allow maximum viewing of the enlarged picture 82. Both lenses 80 and 81 are positioned along the optical axis 50 and are separated by a distance $d_3$ equal to the sum of their focal lengths $f_3$ and $f_4$. The focal length $f_3$ of the first lens 80 is shorter than the focal lenght $f_4$ of the second lens 81. It is this fact which enables the lenses 80 and 81 to enlarge the three-dimensional picture.

Space Conservation

Another approach to the problem of the described optical system being too large or its viewing window being too small, is to utilize methods of minimizing the size of the optical system by conserving space.

The Third Lens

Figure 7:
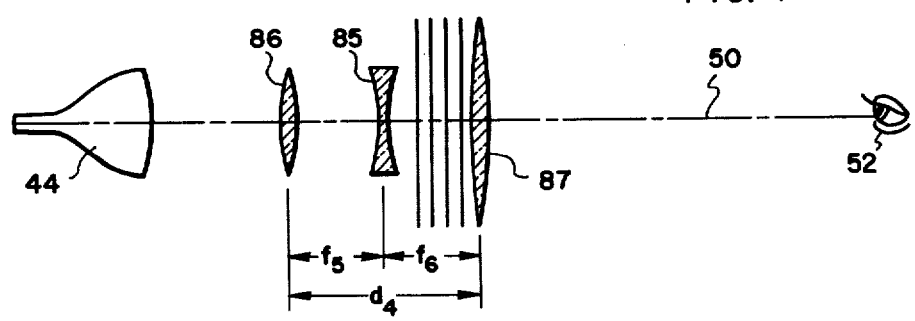
FIG. 7 is a schematic representation of an optical system further comprising a third lens in accordance with the principles of this invention.

One method of conserving space is to position a third lens having a negative focal length between the aforementioned first and second lenses. This technique is illustrated in FIG. 7, in which this negative lens 85 is positioned coaxially along the optical axis 50 between the first lens 86 and 87 are in an enlarging configuration, although this same technique is useful even when the first end second lenses are not in an enlarging configuration. The use of this negative (concave) lens 85 positioned between the two positive lenses 86 and 87 permits the use of relatively short focal lengths $f_5$ and $f_6$ for the first and second lenses 86 and 87 respectively. As a result, the first and second lenses 86 and 87 only need to be separated by a relatively short distance $d_4$, thereby conserving space.

Positioning Beam Splitters between Lenses

Figure 8:
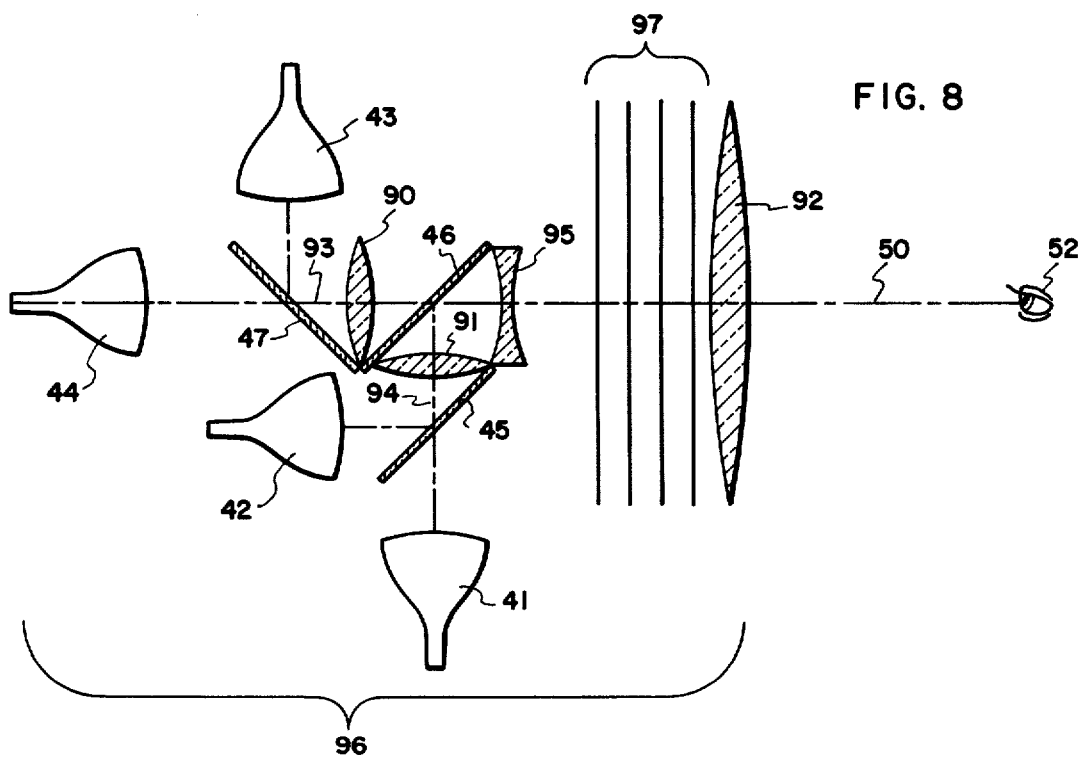
FIG. 8 is a schematic representation of an optical system incorporating beam splitters and lenses for producing an improved three-dimensional picture in accordance with the principles of the invention.

A second method of conserving space is to position the lenses within the beam splitter arrangement itself, with at least one of the beam splitters located between the first and second lenses. An example of this is provided in FIG. 8, which shows one member 46 of the beam splitter arrangement positioned along the optical axis 50 between respective first lenses 90 and 91, and second lens 92, which lenses 90, 91 and 92 are in an enlarging configuration as described above.

Two first lenses 90 and 91 are shown, because the beam splitter 46 combines two branches 93 and 94 of the optical axis 50. Therefore, two lenses 90 and 91 function as the respective first lenses, one for each branch 93 and 94 of the optical axis 50. Also shown is the third lens 95 positioned between the respective first lenses 90 and 91, and the second lens 92. Because the beam splitter 46 is positioned in the space between the lenses 90, 91 and 92, the space normally required for the optical system 96 is minimized.

In this figure the three-dimensional picture 97 is shown to be substantially enlarged. This added enlargement is a second advantage to positioning the beam splitters between the lenses. In optical systems such as the one shown in FIG. 8 the potential enlargement of the picture is directly related to the distance between the display screens and their respective first lenses. The smaller that distance is, the larger the picture can be. Since positioning the lenses inside the beam splitter arrangement puts the first lenses nearer to the display screens, it therefore permits greater enlargement of the three-dimensional picture. This does not mean that positioning the beam splitters between the lenses will enlarge the picture; it only means that such an arrangement permits greater enlargement of the picture, should that be desired.

Multiple Viewing Locations

As stated previously, a third problem of the basic optical system is that any particular perspective of the three-dimensional picture is observable by only one person at a time. A solution to this problem is to construct the optical system in such a way that it produces a plurality of viewing locations so that each member of the audience is free to view independently the picture from any perspective he pleases without interfereing with anyone else's view.

This principle is explained with reference to FIG. 9, which shows an example of two such viewing locations 100 and 101. These viewing locations 100 and 101 are shown to be within a geometrical volume resembling the frustum of a four-sided pyramid, with lateral bounds 102 and 103 representing two of the four sides. Members of the audience 104, 105 and 106 must be located within these bounds 102 and 103 in order to see the three-dimensional picture 107.

Each of these viewing locations 100 and 101 corresponds to a unique optical axis 110 and 111 along which the set of cross-sectional representations 107 are stacked by the optical system 112. As a result, observers 104 and 105, each of whom is centered within the bounds of his respective viewing location 100 and 101, will find that the three-dimensional picture 107 is facing him, although each observer 104 and 105 is located in a unique viewing location 100 and 101. However, if any audience member moves up or down or from side to side, such as observer 106, but stays within the bounds of his viewing location, he will find that his perspective will change accordingly.

Developing Plurality of Optical Axes

In order to develop a plurality of such viewing locations, a plurality of optical axes must first be produced. Normally, only one optical axis is produced by a beam splitter arrangement. However, it is possible to produce a plurality of optical axes by the use of beam splitters, with each beam splitter positioned to divide a single existing optical axis into two unique optical axes.

Figure 10:
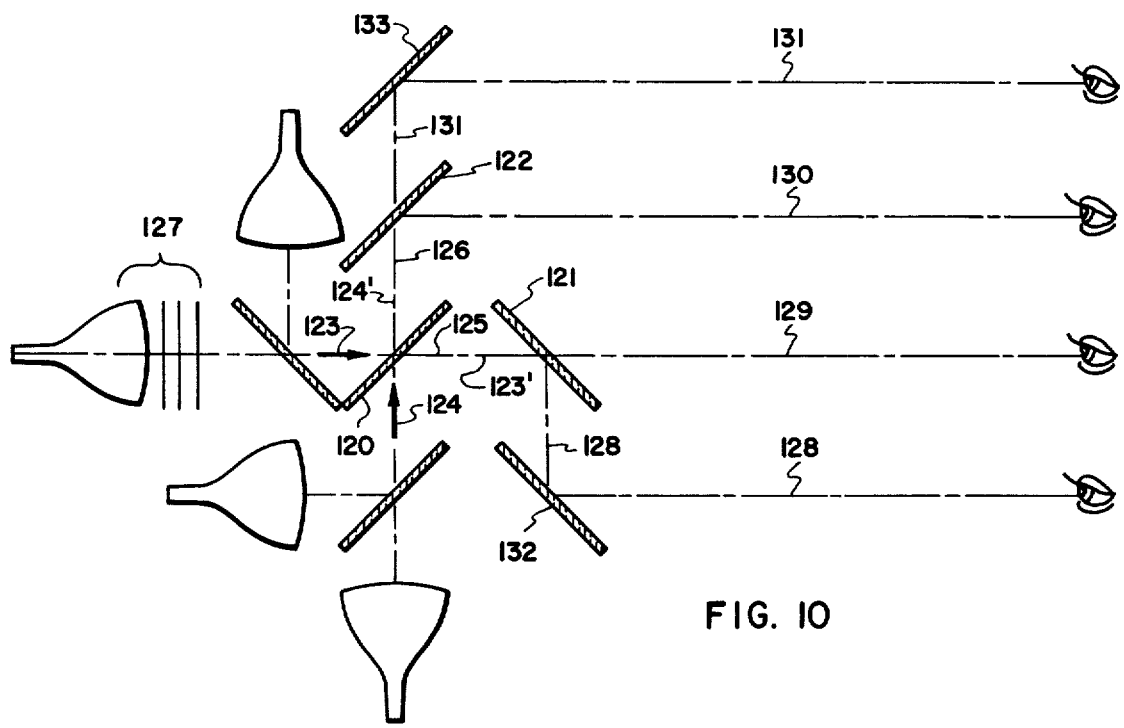
FIG. 10 is a schematic representation of an optical system which produces a plurality of optical axes for developing a plurality of viewing locations such as are demonstrated in FIG. 9.

An example of the foregoing is demonstrated in FIG. 10, which shows three such beam splitters 120, 121, and 122. The first beam splitter 120 actually divides each of the common optical axis' two main branches 123 and 124 into two unique optical axes 123' and 125; and 124' and 126 respectively. However, since axes 123' and 125 follow the same path, they will collectively be referred to hereafter as optical axis 125. Likewise, axes 124' and 126 follow the same path, and so they will be hereafter referred to as optical axis 126. This first beam splitter 120 transmits as much light as it reflects, making the distribution of light in the three-dimensional picture 127 appear the same when viewed along either optical axis 125 or 126. The second beam splitter 121 then divides the first optical axis 125 into two unique optical axes 128 and 129, one of which optical axes 128 is reflected by the beam splitter 121, while the other optical axis 129 passes through this beam splitter 121. In a similar manner, the third beam splitter 122 splits the optical axis 126 into two unique optical axes 130 and 131.

Orientation Restoration Mirrors

After being divided by the beam splitters 121 and 122, the optical axes 128 and 131 are reflected by respective mirrors 132 and 133. If an observer were to look at the three-dimensional picture 127 along axis 128 or 131 before it was reflected by its respective mirror 132 or 133, he would find that the left to right orientation of the picture appeared to be reversed from the normal. In other words, objects which are normally on the left hand side of the picture would appear to be on the right hand side of the picture. To remedy this problem, each of these mirrors faces its respective optical axis 128 and 131 at an angle of approximately 45 degrees, reflecting the axes 128 and 131 in a direction roughly parallel to the axes 129 and 130. By reflecting the optical axes 128 and 131 in this way, the left to right orientations of the representations which are stacked along the optical axes 128 and 131 are reversed, so that the left to right orientation of the three-dimensional picture 127 is the same regardless of the optical axis 128, 129, 130 or 131, along which the picture 127 is viewed.

With Single Viewing Window

Figure 9:
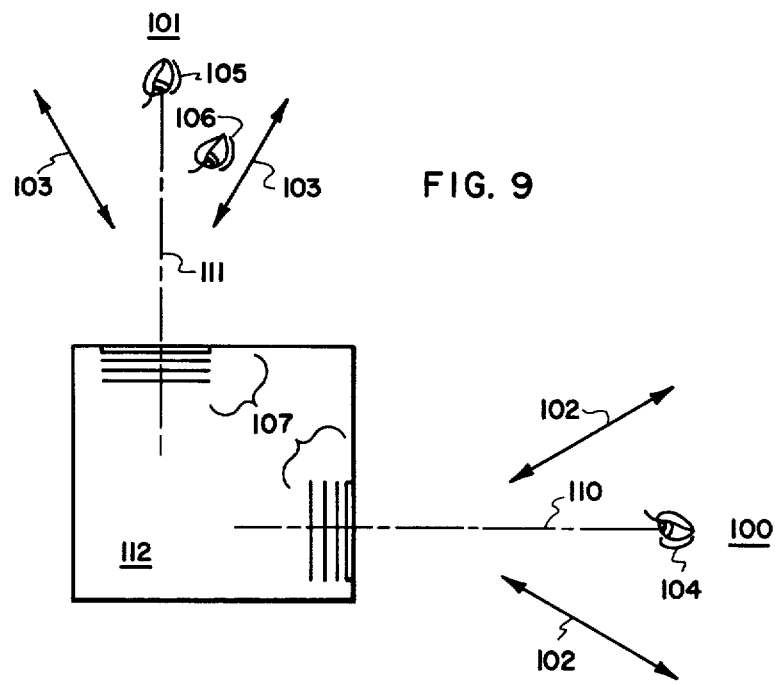
FIG. 9 is a top view of a diagrammatic optical system having two viewing locations for viewing of the three-dimensional picture in accordance with the principles of this invention.

Once a plurality of optical axes have been independently directed, each one will normally pass through its own viewing window as in FIG. 9. This is because the last optical component each optical axis passes through comprises its viewing window. Although multiple viewing windows may be desired at times, this is generally not preferred. An improvement is to direct a plurality of optical axes through a single viewing window at a variety of angles towards their respective viewing locations.

Figure 11:
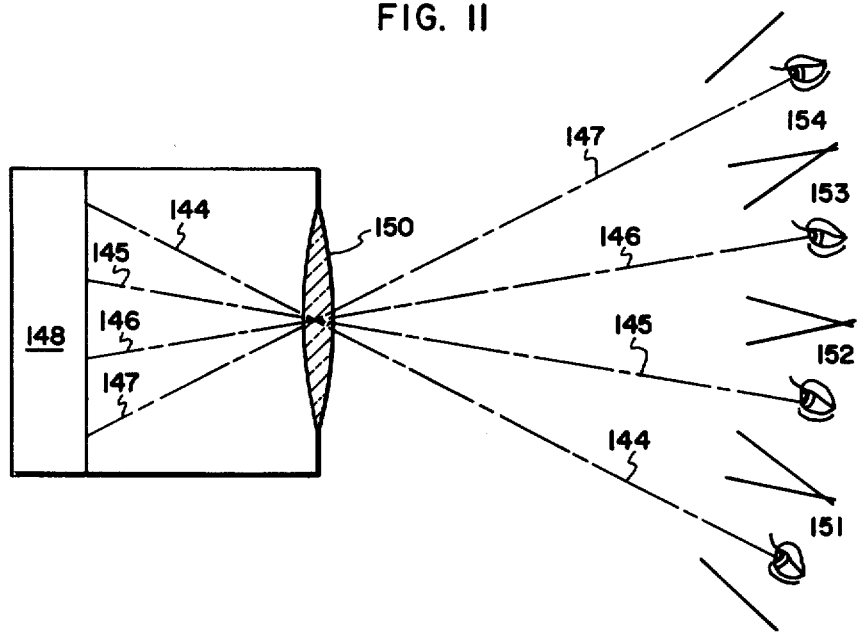
FIG. 11 is a top view of a diagrammatic optical system having a plurality of optical axes, such as are shown in FIG. 10, which are directed through a single viewing window in accordance with the principles of this invention.

An example of this is demonstrated in FIG. 11, which shows four optical axes 144, 145, 146, and 147 which are developed by the optical system 148. These optical axes 144-147 are directed at a variety of angles through the same second lens which, in this example, constitutes the viewing window 150. From there the optical axes 144-147 travel to their respective viewing locations 151, 152, 153 and 154. Members of the audience who are in these viewing locations can view the three-dimensional picture (not shown) through this same viewing window 150, and each member will find that the picture is substantially facing him.

Optical Path Distance Compensation

One problem that may arise when directing a plurality of optical axes through the same viewing window, as described above, is that the three-dimensional picture may appear to be nearer when viewed from a first viewing location than it does when viewed from a second viewing location. If this is the case, it results from the fact that the first optical axis has traveled a shorter distance before passing through the viewing window than has the second optical axis. This difference in optical path distance can be compensated for, however, by the addition of an arrangement of mirrors positioned for altering the distance that each optical axis travels before passing through the viewing window.

Figure 12:
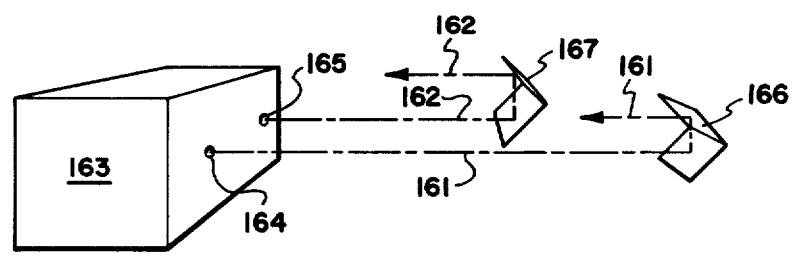
FIG. 12 is a perspective side view of two optical axes which are redirected by a plurality of distance compensation mirrors in accordance with the principles of this invention.

A preferred embodiment of this technique is demonstrated in FIG. 12, which shows two optical axes 161 and 162 which are developed by the optical system 163. In this example, the first optical axis 161 has traveled a shorter distance than has the second optical axis 162 from the display screens within the system 163 to the figure's exit points 164 and 165 respectively. In order to compensate for this difference, the path length of the short optical axis 161 must be lengthened sufficiently to equalize the path lengths of both axes 161 and 162. This is accomplished by directing each of the optical axes 161 and 162 an appropriate distance toward a pair of compensating mirrors 166 and 167, as shown. These mirrors reflect the optical axes 161 and 162 so that they are directed parallel, but in the opposite direction, to their original course. By thus directing these optical axes 161 and 162 along unique paths of differing lengths, each optical axis is independently modified and equalized, thus compensating for any variations in the optical path distances. These optical axes 161 and 162 then continue on towards a single viewing window (not shown) and then to their respective viewing locations (not shown).

Translucency Elimination

Light Blocking Sheets

As stated previously, a fourth problem of the basic optical system is the fact that some of the images in the three-dimensional picture appear to be translucent. This results from the fact that these images only comprised of light, having no substance, and therefore no means to block the light from the portions of the cross-sectional representations which appear to be behind them. A solution to this problem is to position one or more light blocking sheets in front of each of the display screens that display background images, to block the portions of the background images which appear to be behind foreground images.

Figure 13:
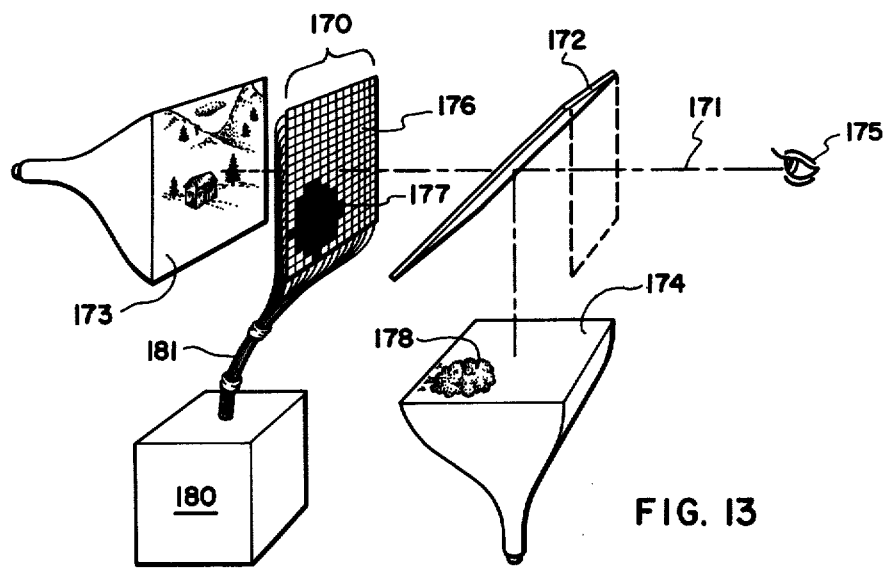
FIG. 13 is a perspective view of an optical system which utilizes a light blocking sheet for minimizing image translucency in accordance with the principles of the invention.

This technique may be explained with reference to FIG. 13, which demonstrates a simple embodiment comprising one light blocking sheet 170 positioned along the optical axis 171 between a beam splitter 172 and a display screen which displays a background cross-sectional representation 173. This sheet 170 has the same dimensions as the cross-sectional representation 173. Also shown is a second display screen for displaying a foreground cross-sectional representation 174. The beam splitter 172 is positioned so as to stack the representation 174 in front of representation 173. As a result, to an observer 175, it appears that the representation 174 is positioned coincidental to the sheet 170.

As is shown, the sheet 170 is divided into a plurality of small sections. Some of these sections 176 are depicted in a clear, light transmitting state, while others 177 are depicted in a dark, light blocking state. The dark sections 177 correspond to the positions of images 178 in the representation 174 which appear to be in front of the representation 173. Therefore, these dark sections 177 block the portions of the representation 173 which appear to be behind these images 178. This makes up for the fact that the images 178 themselves do not block these portions as they should. The portions of the representation 173 that are blocked will, of course, vary with the angle at which the three-dimensional picture is viewed.

These sections 176 and 177 can be independently induced to be alternately light transmitting or light blocking as a result of triggering by external stimuli 180.

The ability to change from light blocking to light transmitting and back again enables the pattern on the sheet 170 to change, to keep pace with the three-dimensional picture as it changes with time. Any form of stimuli is acceptable to induce the sections 176 and 177 to change states, as long as it can be transmitted in the form of electricity by wires, such as the wires 181 shown in the figure. For example, an electric field, or a magnetic field, or electrically induced heat could be used as stimuli. All of these types of stimuli are compatible with liquid crystals, which is the preferred type of material to be used in the small sections 176 and 177. The specific means for developing such a liquid crystal sheet will be apparent to one skilled in the art from description provided herein, taken with conventional technology such as disclosed in Thomas Kallard, *Liquid Crystal Devices* (*State of the Art Review, Volume* 7), Optosonic Press (1973).

While it is intended that the above specification explain the principles of the invention, it is to be understood that these principles have been described by way of examples only. Therefore, it is not desired to restrict the invention to the particular embodiments herein disclosed, but to cover all extensions of these embodiments which are obvious to those skilled in the art, limited only by the scope of the appended claims.

I claim:

1. An apparatus for producing a three-dimensional picture suitable for use with television systems, said apparatus comprising:
   (a) one or more display screens for displaying a set of cross-sectional representations of a scene,
   (b) an arrangement of beam splitters for optically stacking said cross-sectional representations along a common optical axis to form a composite three-dimensional picture for viewing by an audience, and
   (c) at least one positive lens means for developing forward repositioning of the cross-sectional representations toward said audience, said lens means being positioned along said optical axis between said display screens and said audience and being separated from said display screens by an optical path distance that is greater than one focal length of said lens means.

2. An apparatus as defined in claim 1, wherein said beam splitters include semi-transparent mirrors.

3. An apparatus as defined in claim 1, wherein said display screens have relative positions which are substantially fixed.

4. An apparatus as defined in claim 1, wherein said display screens sequentially display a series of sets of concurrently displayed cross-sectional representations such that each set of concurrently displayed representations corresponds to a particular time frame of said scene.

5. An apparatus as defined in claim 1, further comprising a second positive lens means for compensating for uneven enlargement of said cross-sectional representations caused by said first lens means, wherein said enlargement compensation is obtained by enlarging the background representations by successively greater degrees compared to the frontmost representation, said second lens means being positioned along said optical axis, between said first lens means and said audience, said first and second lens means being separated by an optical path distance approximated by the sum of their respective focal lengths.

6. An apparatus as defined in claim 5, wherein the focal length of said first lens means is shorter than the focal length of said second lens means for obtaining an enlarged three-dimensional picture.

7. An apparatus as defined in claim 5, further comprising a third lens means having a negative focal length positioned along said optical axis between said first and second lens means, for conserving space by reducing the required distance between said first and second lens means.

8. An apparatus as defined in claim 5, wherein at least one member of said beam splitter arrangement is positioned along said optical axis between said first lens means and said second lens means for conserving space and for permitting greater enlargement of said three-dimensional picture.

9. An apparatus as defined in claim 1, further comprising means for producing a plurality of viewing locations from which to view said three-dimensional picture by a plurality of observers, wherein said viewing locations are developed by directing a plurality of optical axes along unique paths towards respective viewing locations, and wherein said representations are stacked along each of said optical axes.

10. An apparatus as defined in claim 9, wherein said plurality of optical axes are developed by the use of beam splitters, each of said beam splitters being positioned for dividing a single existing optical axis into two unique optical axes.

11. An apparatus as defined in claim 10, further comprising a mirror positioned along at least one of said unique optical axes, facing said optical axis at an angle of approximately 45 degrees, for reversing the left to right orientation of the cross-sectional representations which are stacked along said optical axis.

12. An apparatus as defined in claim 9, wherein a plurality of said optical axes are directed through a single viewing window at a variety of angles towards their respective viewing locations.

13. An apparatus as defined in claim 12, further comprising an arrangement of mirrors for substantially compensating for any variations in the optical path distance from said three-dimensional picture to said viewing window among said plurality of optical axes, said mirrors positioned to direct said plurality of optical axes along unique paths of differing lengths for developing said compensation.

14. An apparatus as defined in claim 1, further comprising means for selectively blocking light passage from portions of background representations which appear to be behind foreground images, for minimizing any apparent translucency of the three-dimensional picture, said light blocking means comprising a sheet which has substantially the same dimensions as a corresponding cross-sectional representation, and which is positioned along said optical axis between a display screen which displays said cross-sectional representation and said audience, said sheet comprising a plurality of small sections which can be induced to be alternately light transmitting or light blocking as a result of triggering by external stimuli.

15. An apparatus as defined in claim 14, wherein said small sections comprise liquid-crystal means to develop said light blocking effect.

16. An apparatus for producing a three-dimensional picture suitable for use with television systems, said apparatus comprising:

(a) one or more display screens for displaying a set of cross-sectional representations of a scene, (b) means for optically stacking said cross-sectional representations along a common optical axis to form a composite three-dimensional picture for viewing by an audience, and (c) means for producing a plurality of viewing locations from which to view said three-dimensional picture by a plurality of observers, wherein said viewing locations are developed by directing a plurality of optical axes along unique optical paths towards respective viewing locations, and wherein said representations are stacked along each of said optical axes.

17. An apparatus as defined in claim 16, wherein said optical stacking means comprises an arrangement of beam splitters.

18. An apparatus as defined in claim 16, wherein said plurality of optical axes are developed by the use of beam splitters, each of said beam splitters being positioned for dividing a single existing optical axis into two unique optical axes.

19. An apparatus as defined in claim 18, further comprising a mirror positioned along at least one of said unique optical axes, facing said optical axis at an angle of approximately 45 degrees, for reversing the left to right orientation of the cross-sectional representations which are stacked along said optical axis.

20. An apparatus as defined in claim 16, wherein a plurality of said optical axes are directed through a single viewing window at a variety of angles toward their respective viewing locations.

21. An apparatus as defined in claim 20, further comprising an arrangement of mirrors for substantially compensating for any variations in the optical path distance from said three-dimensional picture to said viewing window among said plurality of optical axes, said mirrors positioned to direct said plurality of optical axes along unique paths of differing lengths for developing said compensation.

22. An apparatus for producing a three-dimensional picture suitable for use with television systems, said apparatus comprising:

(a) one or more display screens for displaying a set of cross-sectional representations of a scene, (b) means for optically stacking said cross-sectional representations along a common optical axis to form a composite three-dimensional picture for viewing by an audience, and (c) means for selectively blocking light passage from portions of background representations which appear to be behind foreground images, for minimizing any apparent translucency of said three-dimensional picture, said light blocking means comprising a sheet which has substantially the same dimensions as a corresponding cross-sectional representation and which is positioned along said optical axis between a display screen which displays said cross-sectional representation and said audience, said sheet comprising a plurality of small sections which can be induced to be light transmitting or light blocking primarily as a result of triggering by electrically transmitted stimuli.

23. An apparatus as defined in claim 22, wherein said optical stacking means comprises an arrangement of beam splitters.

24. An apparatus as defined in claim 22, wherein said small sections comprise liquid crystal means to develop said light blocking effect.

25. A method for producing images in a three-dimensional television imaging system, comprising the steps of:

(a) displaying a set of cross-sectional representations of a scene on a display screen;

(b) concurrently stacking said set of representations along a common optical axis to form a composite three-dimensional television picture; and (c) developing forward repositioning of the optically stacked representations.

26. A method as defined in claim 25, wherein at least sixteen cross-sectional representations are displayed.

27. Method as defined in claim 25, further comprising the step of minimizing apparent translucency of said picture by positioning light blocking means at suitable locations along said optical axes to block light passage through images appearing to be positioned substantially coincidental to said light blocking means, said light blocking means to be triggered by external stimuli.

28. A method as defined in claim 25, further comprising the steps of producing a plurality of viewing locations from which to view said three-dimensional picture, wherein said viewing locations are developed by directing a plurality of optical axes along unique optical paths towards the respective viewing locations, and wherein said representations are stacked along each of said optical axes.

29. A method as defined in claim 28, further comprising the steps of correcting side to side orientation of representations whose orientation has been reversed during transmission through the imaging system.

30. Method as defined in claim 28, further comprising the step of projecting a plurality of said optical axes through a single viewing window at differing angles of incidence to form a variety of observation angles toward their respective viewing locations.

* * * * *